Patented Aug. 5, 1924

1,503,481

UNITED STATES PATENT OFFICE.

HERBERT EDWIN COCKSEDGE, OF HARTFORD, ENGLAND, ASSIGNOR TO THE SOLVAY PROCESS COMPANY, OF SOLVAY, NEW YORK, A CORPORATION OF NEW YORK.

PROCESS OF FORMING SODIUM CARBONATE.

No Drawing.    Application filed October 31, 1922.   Serial No. 598,121.

*To all whom it may concern:*

Be it known that I, HERBERT EDWIN COCKSEDGE, a subject of the King of Great Britain, residing at Hartford, Cheshire, England, have invented a new and Improved Process of Forming Sodium Carbonate, of which the following is a specification.

As is well known sodium carbonate ($Na_2CO_3$), the soda ash of commerce, is formed by heating sodium bicarbonate ($NaHCO_3$) at an elevated temperature and appears in the form of a relatively dense powder of compactly arranged particles. If, however, sodium bicarbonate is heated at a temperature below that required to form sodium carbonate, i. e., not much, if any, exceeding 100° C. a different compound, intermediate between sodium bicarbonate and sodium carbonate, having the formula $Na_2CO_3.3NaHCO_3$, is formed. This compound which, together with the process of forming the same, I have described in another application for Letters Patent filed by me, has the physical form of fine needle-like crystals, very different from the sodium bicarbonate from which it is made and from ordinary sodium carbonate and constituting a light, fluffy mass.

I have found that if this compound be heated at the temperature required to convert sodium bicarbonate into sodium carbonate, i. e., above 100° C. it will also be converted into sodium carbonate which reaction I will represent by the equation

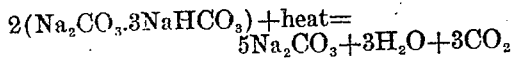
$$2(Na_2CO_3.3NaHCO_3) + heat = 5Na_2CO_3 + 3H_2O + 3CO_2$$

The sodium carbonate thus formed however, instead of being in the form it has when made by the processes heretofore employed, retains to a great extent the crystalline structure of the compound from which it is formed, thus giving by reason of the cross packing of the elongated needle-like crystals, a soda ash in an extremely light, fluffy form such as is called for by the trade.

In carrying my process into effect, the compound $Na_2CO_3.3NaHCO_3$ to be used in forming the sodium carbonate may be produced according to the process described in my application for Letters Patent above referred to (i. e., by heating sodium bicarbonate at a temperature below that required to convert it into sodium carbonate,) or in any other suitable manner and it is then heated to form the carbonate in any suitable manner such as that in which sodium bicarbonate is heated for the same purpose, by passing it through a furnace or heater to which the proper degree of heat is applied. The temperature in the furnace may rise as high at 300° C. or sufficiently to effect the calcining of the compound in its passage therethrough so that the discharge shall be sodium carbonate.

The product while it is in chemical composition sodium carbonate is distinguished by the fine needle-like particles which characterize the compound from which the carbonate is formed and by its density.

Its density will depend upon the purity of the compound, $Na_2CO_3.3NaHCO_3$, employed but will in any case be materially less than that of sodium carbonate produced by the processes heretofore employed. The desirability of this will be readily understood by those skilled in the art.

(When in the claims I speak of the compound having the formula $Na_2CO_3.3NaHCO_3$, I mean the substance described in my application for Letters Patent above referred to, which is characterized by its fine needle-like crystal form and refractive indices, and I mean also to include this substance when containing impurities or mixed with other ingredients so long as such impurities or admixtures do not act to prevent or counteract the conversion of the substance into sodium carbonate.)

What I claim as new and desire to secure by Letters Patent is:—

1. The process of forming sodium carbonate which consists in heating a compound having the formula $Na_2CO_3.3NaHCO_3$ at a temperature above 100° C.

2. The process of forming sodium carbonate which consists in heating a compound having the formula $Na_2CO_3.3NaHCO_3$ so as to drive off water and carbondioxid.

3. The process of forming sodium carbonate which consists in heating sodium bicarbonate so as to form a compound having the formula $Na_2CO_3.3NaHCO_3$ and then heating such compound at a higher temperature to form the sodium carbonate.

4. As a new article of manufacture sodium carbonate characterized by fine needle-like particles.

5. As a new article of manufacture sodium carbonate having the physical form of fine needle-like particles intermixed so as to form a fluffy mass of relatively low density.

6. As a new article of manufacture a sodium carbonate material containing fine needle-like carbonate particles in sufficient quantity to give a mass of relatively low density.

7. The process of forming a sodium carbonate material of relatively low density which consists in heating a mixture containing a substantial proportion of the compound $Na_2CO_3.3NaHCO_3$ so as to convert said compound into sodium carbonate.

In testimony whereof I affix my signature, this 21st day of September, 1922.

HERBERT EDWIN COCKSEDGE.